(12) United States Patent
Valente et al.

(10) Patent No.: US 9,151,077 B2
(45) Date of Patent: Oct. 6, 2015

(54) KEY AND CYLINDER LOCKING ASSEMBLY CORRESPONDING TO SAID KEY

(71) Applicants: Massimo Valente, Anet (FR); Marco Migliasso, Turin (IT)

(72) Inventors: Massimo Valente, Anet (FR); Marco Migliasso, Turin (IT)

( * ) Notice: Subject to any disclaimer, the term of this patent is extended or adjusted under 35 U.S.C. 154(b) by 0 days.

(21) Appl. No.: 14/331,887

(22) Filed: Jul. 15, 2014

(65) Prior Publication Data

US 2015/0013404 A1    Jan. 15, 2015

Related U.S. Application Data

(63) Continuation-in-part of application No. PCT/IB2013/000045, filed on Jan. 15, 2013.

(30) Foreign Application Priority Data

Jan. 15, 2014   (EP) ..................................... 14000142

(51) Int. Cl.
| | |
|---|---|
| *E05B 27/06* | (2006.01) |
| *E05B 19/06* | (2006.01) |
| *E05B 19/12* | (2006.01) |
| *E05B 19/18* | (2006.01) |
| *E05B 19/00* | (2006.01) |
| *E05B 35/00* | (2006.01) |

(Continued)

(52) U.S. Cl.
CPC .............. *E05B 19/0023* (2013.01); *B23C 3/35* (2013.01); *E05B 19/0017* (2013.01); *E05B 27/0003* (2013.01); *E05B 35/004* (2013.01); *E05B 27/0096* (2013.01); *Y10T 70/7486* (2015.04); *Y10T 70/7791* (2015.04); *Y10T 409/300952* (2015.01)

(58) Field of Classification Search
CPC . E05B 19/18; E05B 19/0023; E05B 19/0017; E05B 19/0029; E05B 19/0035; E05B 19/0041; E05B 19/0052; E05B 19/0058; E05B 19/0064; E05B 19/0094; E05B 27/0003; E05B 27/0096; E05B 35/004; B23C 3/35; Y10T 70/7791; Y10T 70/7486; Y10T 409/300952
USPC ........... 70/358, 386, 395, 396, 399, 409–411, 70/453, 454, 493
See application file for complete search history.

(56) References Cited

U.S. PATENT DOCUMENTS 104,749 A  *  6/1870  Linder ............................ 70/120
366,387 A  *  7/1887  Filer ................................ 70/39

(Continued)

FOREIGN PATENT DOCUMENTS

| | | |
|---|---|---|
| EP | 1 662 077 A1 | 5/2006 |
| FR | 2 522 053 A1 | 8/1983 |

(Continued)

OTHER PUBLICATIONS

International Search Report issued in International Application No. PCT/IB2013/000045 dated Oct. 15, 2013.

*Primary Examiner* — Lloyd Gall
(74) *Attorney, Agent, or Firm* — Oliff PLC

(57) ABSTRACT

A key includes a blade having an axially-extending window formed by an opening through a thickness of the blade between two opposite faces thereof, and a set of rollers mounted in series along the window, with each roller being freely rotatable around a spindle fixed transversely across the window in a width direction of the blade. The key may be a security key designed to cooperate with a pin tumbler cylinder.

19 Claims, 5 Drawing Sheets

(51) Int. Cl.
*B23C 3/35* (2006.01)
*E05B 27/00* (2006.01)

(56) References Cited

U.S. PATENT DOCUMENTS

| | | | | |
|---|---|---|---|---|
| 480,237 A * | 8/1892 | Metcalf | | 70/396 |
| 939,679 A * | 11/1909 | Freud | | 70/411 |
| 962,558 A * | 6/1910 | Eckert | | 70/395 |
| 1,022,900 A * | 4/1912 | Von Varyas | | 70/411 |
| 1,037,970 A * | 9/1912 | Norberg | | 70/45 |
| 1,735,868 A * | 11/1929 | Klingel | | 70/421 |
| 2,430,914 A * | 11/1947 | Ciani | | 70/411 |
| 3,243,979 A * | 4/1966 | Silvern | | 70/411 |
| 3,877,267 A * | 4/1975 | Harris, Jr. | | 70/358 |
| 4,287,735 A * | 9/1981 | Brunken et al. | | 70/395 |
| 4,377,082 A * | 3/1983 | Wolter | | 70/493 |
| 5,050,412 A * | 9/1991 | Errani | | 70/358 |
| 5,170,651 A * | 12/1992 | Errani | | 70/493 |
| 5,520,035 A * | 5/1996 | Eizen et al. | | 70/358 |
| 5,724,841 A * | 3/1998 | Botteon | | 70/493 |
| 5,775,144 A * | 7/1998 | Pagalday | | 70/358 |
| 8,485,006 B2 * | 7/2013 | Kiiski | | 70/366 |
| 2008/0236223 A1* | 10/2008 | Markbreit et al. | | 70/358 |
| 2010/0199731 A1* | 8/2010 | Kofman | | 70/358 |
| 2011/0048084 A1* | 3/2011 | Tong | | 70/491 |
| 2012/0055212 A1* | 3/2012 | Nicoara | | 70/276 |
| 2013/0091911 A1* | 4/2013 | Dolev | | 70/493 |
| 2013/0298621 A1* | 11/2013 | Clifford | | 70/358 |
| 2013/0298623 A1* | 11/2013 | Clifford | | 70/493 |

FOREIGN PATENT DOCUMENTS

| | | |
|---|---|---|
| FR | 2 651 524 A1 | 3/1991 |
| WO | WO 99/64703 A1 | 12/1999 |
| WO | WO 02/42582 A1 | 5/2002 |
| WO | WO 2009/012541 A1 | 1/2009 |
| WO | WO 2009/040798 A2 | 4/2009 |

* cited by examiner

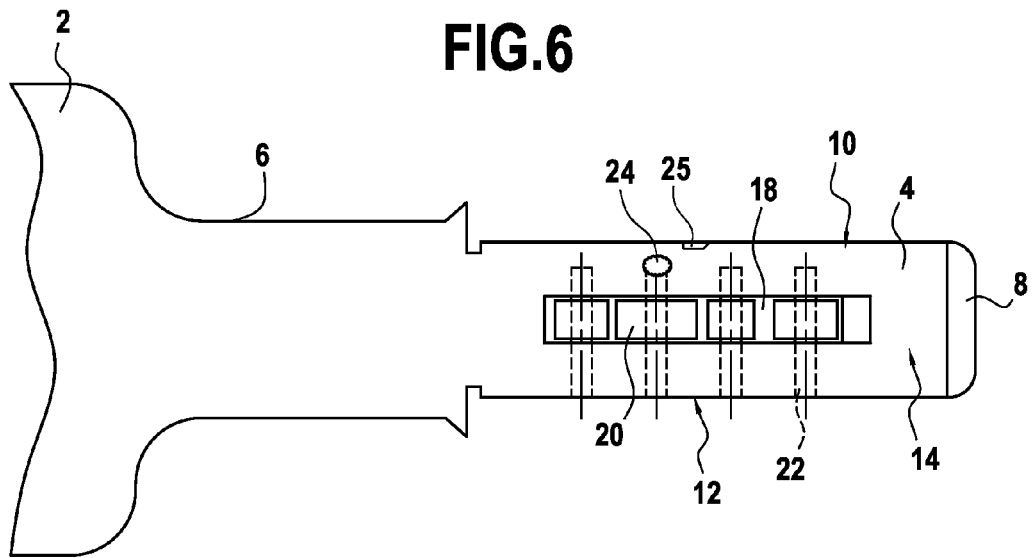
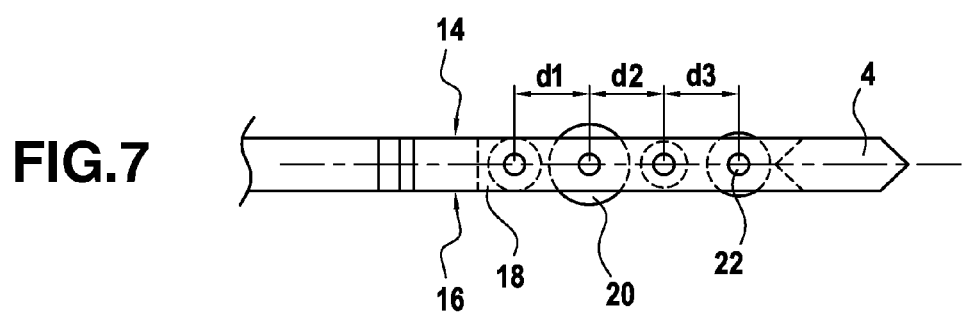

KEY AND CYLINDER LOCKING ASSEMBLY CORRESPONDING TO SAID KEY

CROSS-REFERENCE TO RELATED APPLICATIONS

This is a Continuation-in-Part of Application No. PCT/IB2013/00045 filed Jan. 15, 2013, and claims the benefit of European Patent Application No. 14000142.1 filed Jan. 15, 2014. The disclosures of the prior applications are hereby incorporated by reference herein in their entirety.

BACKGROUND

This invention is in the field of security locks in which the aim is to control key duplication. In this context, the invention concerns a security key and a locking assembly formed by said key and a lock cylinder with which the key is designed to cooperate.

SUMMARY

The locking assembly according to the invention comprises a key and a lock cylinder comprising a rotor and a stator, in addition to a set of pins and counter-pins which, by their respective positioning, enable rotation of the rotor in the stator, so as to proceed to locking or unlocking the lock.

The key according to the invention classically comprises a bow and a blade designed to be inserted into the keyway of the lock cylinder. Keys preferably used belong to the type of bit keys in which the blade has impressions engraved on the faces and the edges to cooperate with the pins in the lock cylinder when the blade is inserted into said lock cylinder. The pins are placed in bores arranged radially in the cylinder, said pins being mobile in translation in their respective bores and spring-loaded so as to be urged towards the middle of the lock cylinder and to move in the reverse direction when the key is correctly positioned in the cylinder.

When the appropriate key is inserted, that is, the key whose impressions have the right dimensions and are correctly placed on the blade, each of the pins penetrates into the matching impression recess. The pins are thence placed in an opening position in which they allow the rotor to turn in the stator of the cylinder and thereby unlock the locking assembly.

The large number of impressions and the way in which they are positioned, at best rather on the key faces than on the key edges, make duplication of said keys difficult, thus increasing the security of the locking assembly.

This invention proposes means to produce the signature pattern of security keys in a different way. According to an advantageous characteristic of the invention, the blade of the key axially comprises a window that forms an opening through the thickness of the blade from one face to the opposite one, and at least one roller is mounted on a spindle transversely to the window. The diameter of the roller is determined such that when the key is inserted fully into the keyway of the lock cylinder, the surface of the roller cooperates with the end of a pin placed radially in the lock cylinder. Several rollers can be mounted in the window one after the other in succession along the axis of the blade and the successive rollers can have different diameters.

A key is thus proposed which cannot be duplicated by machining, particularly with respect to its signature pattern which is determined by the rollers. The combination of different positions of rollers having different diameters provides numerous possibilities for obtaining a unique key signature pattern.

According to a characteristic of the invention, the diameter of the roller can be greater than the thickness of the blade, such that said roller, when mounted on a spindle fixed in the median plane of the key, projects from both faces of the blade. A security key is thus proposed comprising elements projecting from the blade faces which are different from the known impressions which are hollowed out as recesses in the blade in the case of usual bit keys, and which nonetheless do not require complex machining.

The use of a roller to cooperate with the pins means that a symmetrical key can easily be produced, that is, a key whose blade can be inserted into the keyway of the lock cylinder in either direction. When impressions are made on a face or side of the blade, identical impressions must be made on the opposite face or side symmetrically with respect to a point on the median axis of the key at keyway level. When using a roller, the symmetrical configuration can be obtained with ease by centering the roller on the median axis such that there is an identical protuberance on either side of the key.

Another advantage in using a roller is the ease with which the key slides into the keyway of the lock cylinder. The roller is mounted to rotate freely around its axis, so that when the key is inserted into the keyway it slides easily over the pins along its pathway. It is understood that the key will slide easily both when it is being inserted into the keyway and when it is being removed from it.

The invention also proposes a locking assembly comprising a key and a lock cylinder comprising a rotor and a stator, in addition to a set of pins and counter-pins which, by their respective positioning, enable rotation of the rotor in the stator for locking or unlocking.

According to an advantageous characteristic of the invention, the pins are especially arranged to slide radially in the rotor so that each one corresponds to a roller on the security key when the key is inserted into the lock cylinder as far as it will go.

In a preferred embodiment according to the invention, a set of rollers can be arranged axially in series in the window formed in the thickness of the key blade, there being provided a corresponding set of pins in the lock cylinder, with the number of pins in accordance with the number of rollers and the space between each pin in their axial arrangement in accordance with the space between each roller.

It is easily understood that said pins will be driven into the rotor to different depths, depending on the diameter of the corresponding roller, when the key is inserted as far as it will go.

The keyway made in the lock cylinder comprises two grooves placed symmetrically on either side of the keyway so that those rollers the diameter of which is larger than the thickness of the blade (and which therefore project beyond the edge of the blade) can pass through the keyway. The two grooves on either side of the keyway thus form a guide-way for the peripheral surface of the rollers.

BRIEF DESCRIPTION OF THE DRAWINGS

The invention will now be more completely described in relation with its preferred characteristic features and their advantages, referring to FIGS. 1 to 5 in which:

FIG. 6 is a view similar to FIG. 1 for a key according to the invention with a signature pattern involving additionally dot impressions made by recesses in the fixed surface of the blade;

FIG. 7 is similar to FIG. 2 except for its showing varying spaces between the roller spindles;

DETAILED DESCRIPTION OF THE EMBODIMENTS

Figure 1:
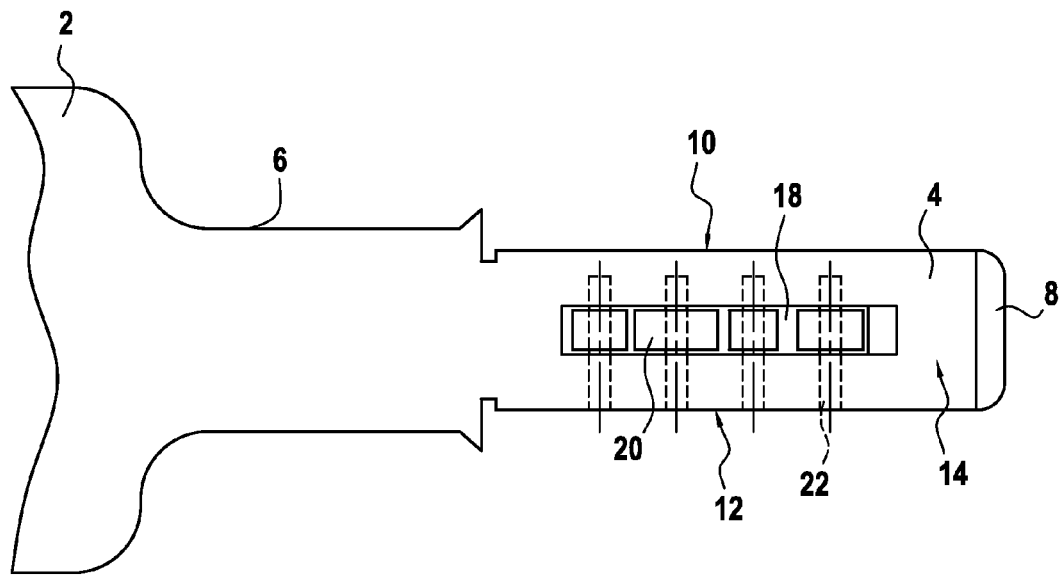
FIG. 1 is a front view of a key according to an embodiment of the invention which comprises four rollers placed axially in a window formed in the middle of the key blade.

As illustrated in FIG. 1, the key comprises a bow 2, partly visible, and a blade 4 designed to be inserted into the lock cylinder. An intermediate neck 6 is formed between the bow and the blade. At its junction with the blade, it has two shoulders that prevent the key from going any further when it is inserted into the lock cylinder.

Blade 4 has a flat shape, here of rectangular section, and comprises a free front end 8 placed axially opposite the neck, cut to form a point. The blade has two edges 10 and 12 and two main faces 14 and 16.

According to the invention, the blade has a window 18 which forms an opening through the key from one side to the other, extending axially and centrally along the blade, that is, at an equal distance from the edges. It can be understood that, in this arrangement, the median axis of the window is the same as that of the median axis of the blade.

Rollers 20 are placed in the window. They are each mounted to rotate freely around a respective spindle 22 placed transversely in relation to the window. In the illustrated example, there are four rollers, placed successively along the window.

Each of the spindles is mounted in a blind hole which extends transversely from one of the blade edges at an equal distance from both faces. The spindle is inserted into the blind hole via said edge until it comes up against the bottom of the blind hole. Said hole has a depth such that the bottom of the blind hole is situated transversely outside the window, such that the spindle inserted into the hole passes through the window.

Each roller is mounted to rotate freely around its spindle which is placed transversely in relation to the median blade axis, such that each roller is designed to turn in a direction parallel to said median blade axis, which corresponds to the direction in which the blade is inserted into the lock cylinder. As described below, this facilitates insertion and removal of the key with respect to the lock cylinder. The roller here is in the form of a straight cylindrical roller, it being understood that it could alternately take other forms provided it fulfills its role of cooperation with the corresponding pin of the lock cylinder and enables the roller to slide past the pins when the key is inserted into the keyway. The straight cylindrical form is the most suited to cooperate with the end of the pins when they are directed radially in the rotor at an angle with respect to the generatrix of the cylindrical circumference of the roller.

The rollers can be of different diameters. Depending on their diameter, they may or may not project beyond the blade. Thus, a roller will project beyond the blade when its diameter is greater than the thickness of the blade, whereas it will be entirely contained within the thickness of the blade when its diameter is less than that of the blade. It is understood that since the spindle is inserted into a blind hole which extends at an equal distance from the blade faces, the roller will protrude the same distance beyond each blade face.

Figure 2:
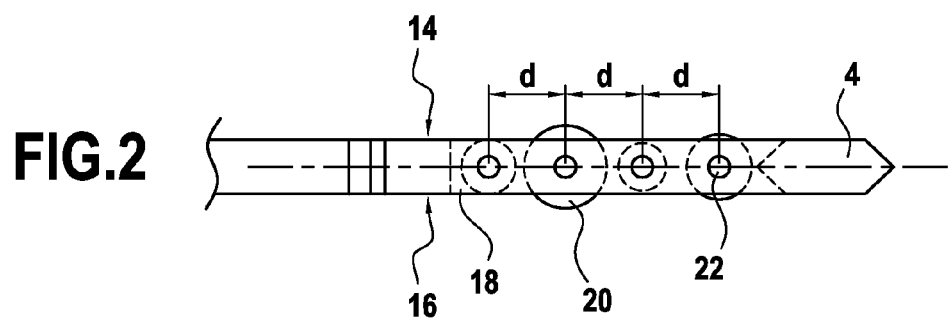
FIG. 2 is a bottom view of the key illustrated in FIG. 1.

As shown in FIG. 2, the center-to-center distance between two neighboring rollers remains the same along the entire window. That center-to-center distance (marked d in the figure) is so specified that any two rollers can be placed side by side without touching each other, whatever their diameter.

The number of rollers and the different available sizes of each roller, results in a very large number of possible combinations, which offers a very wide signature pattern choice for this type of key.

Figure 4:
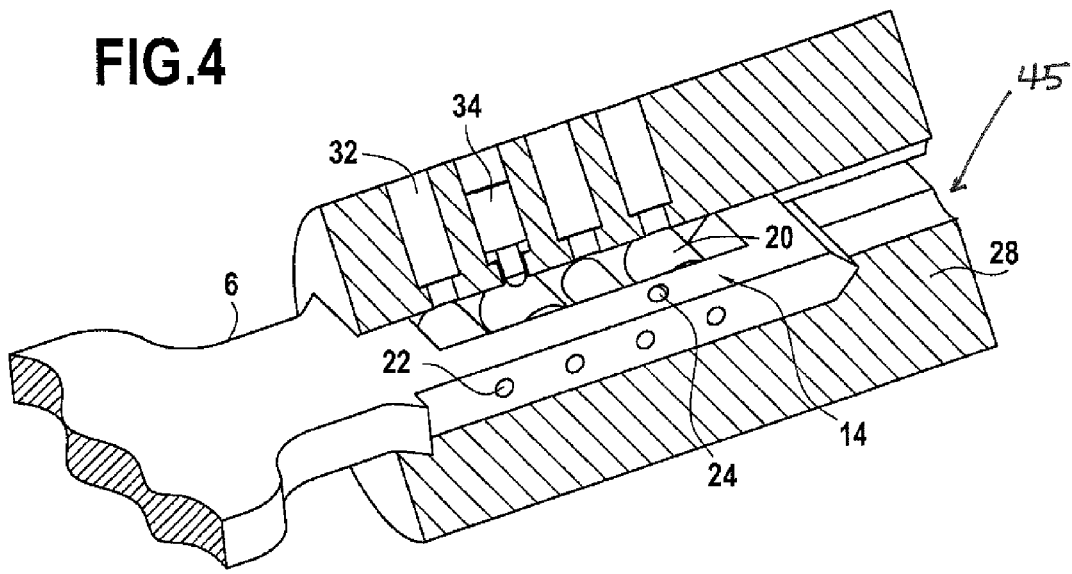
FIG. 4 is a schematic drawing illustrating the cooperation of a key according to the invention with the corresponding security cylinder, with the cylinder only being represented partially.

The blade can also comprise impressions 24 (as shown in FIG. 4) engraved on the key faces or on the key edges so as to form recesses of different dimensions and depths, as would be known from previous constructions. Said impressions may have cup forms, drilled to various depths with respect to the plane of one of the blade faces. In the particular case described, the impressions are distributed symmetrically with respect to the median axis so as to make the key reversible, that is, to enable the blade to be inserted into the keyway indifferently in one direction or in the other. It can understood that said impressions are positioned to take into account the presence of the window on either side of the key and the presence of blind holes through the edges.

We are now going to describe a process to construct a key as described previously. The manufacturing process comprises three distinct successive steps, that is, a first machining step during which the basic elements of the key are made, a second mounting step in which a key signature pattern according to the invention, specific in that it corresponds to a lock cylinder, is created by assembling the different components of the corresponding key in a pre-determined configuration, and a third machining step in which additional operations are carried out to form the impressions on the blade.

The first step consists in machining the window to be formed in the key and the blind holes. The result is a standard key model, different from regular keys in that it has a window, but which can be used for different key models according to the invention.

The spindles are also made during this first step and are designed to be inserted into the blind holes during mounting. Each of the spindles is machined in the usual way to obtain a pre-determined diameter and length. Finally, the rollers are made with different diameters so that they can be adapted to the specific needs of each of key.

The key bittings are obtained in the second step by mounting at least one roller of specific diameter in the window. The number of rollers, their respective diameters, and their arrangement from one side of the window to the other, offer a large number of signature patterns which give the key its uniqueness and traceability.

During mounting of each of the rollers, the roller is held in place in the window at the level of one of the blind holes while inserting a rotating spindle into said blind hole so that it passes through the hole engraved in the roller. When the spindle is pressed up against the bottom of the blind hole, the spindle is prevented from moving out of the hole by crushing the edge of the blind hole receiving the spindle in order to reduce the opening diameter of the hole and prevent the spindle from moving. Said fixation by crushing the edges has the advantage of preventing the key from being dismounted.

The signature pattern which is specific to said key and makes it unique and which therefore contributes to the security of the locking assembly it is a part of, is also obtained by machining impressions during the third step. According to the invention, said impressions are machined after forming the window and holes so that the impressions will be positioned around them. The layout of the impressions is specific to the key and corresponds to a specific layout of the cooperating elements comprised in the lock cylinder with which the key matches.

Figure 3:
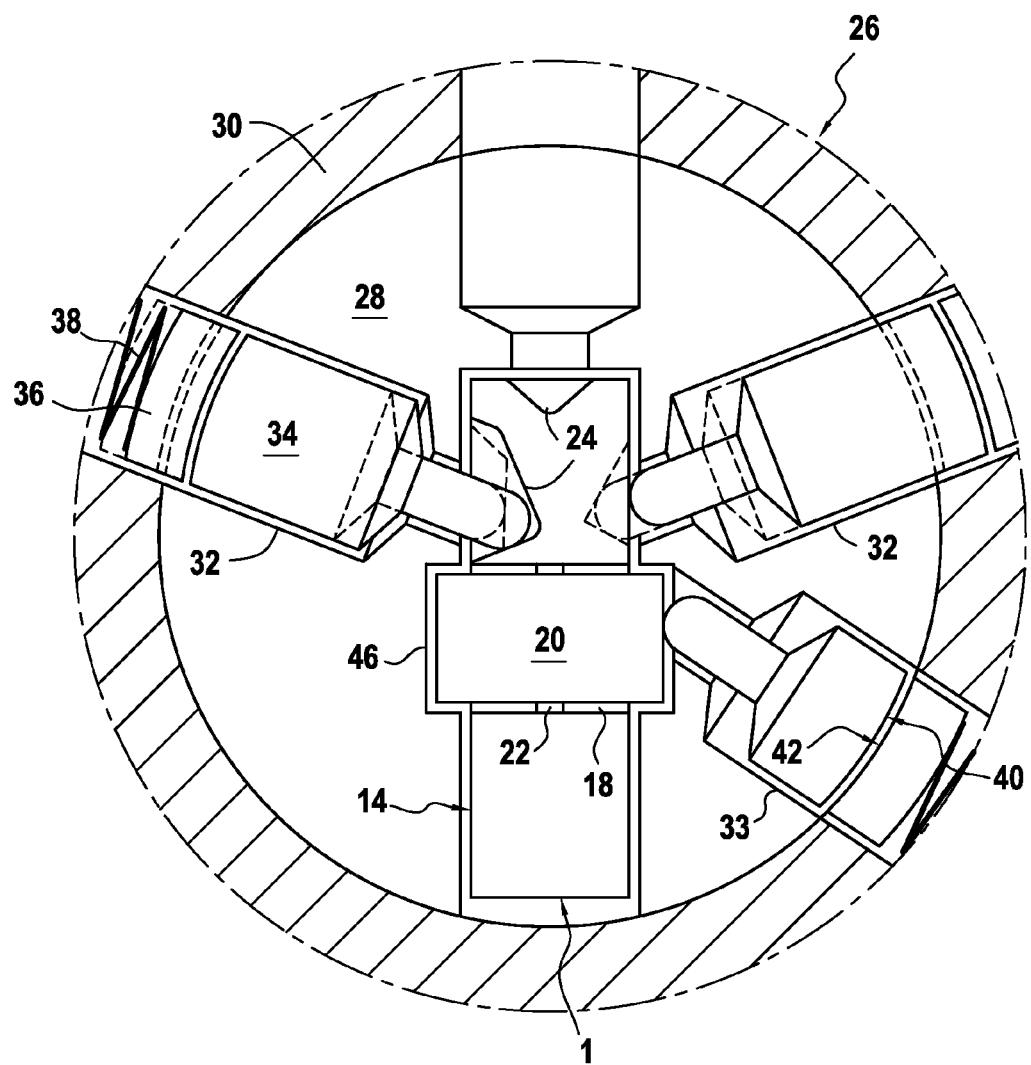
FIG. 3 is a cross-section of the security cylinder corresponding to the key illustrated in FIGS. 1 and 2.
Figure 5:
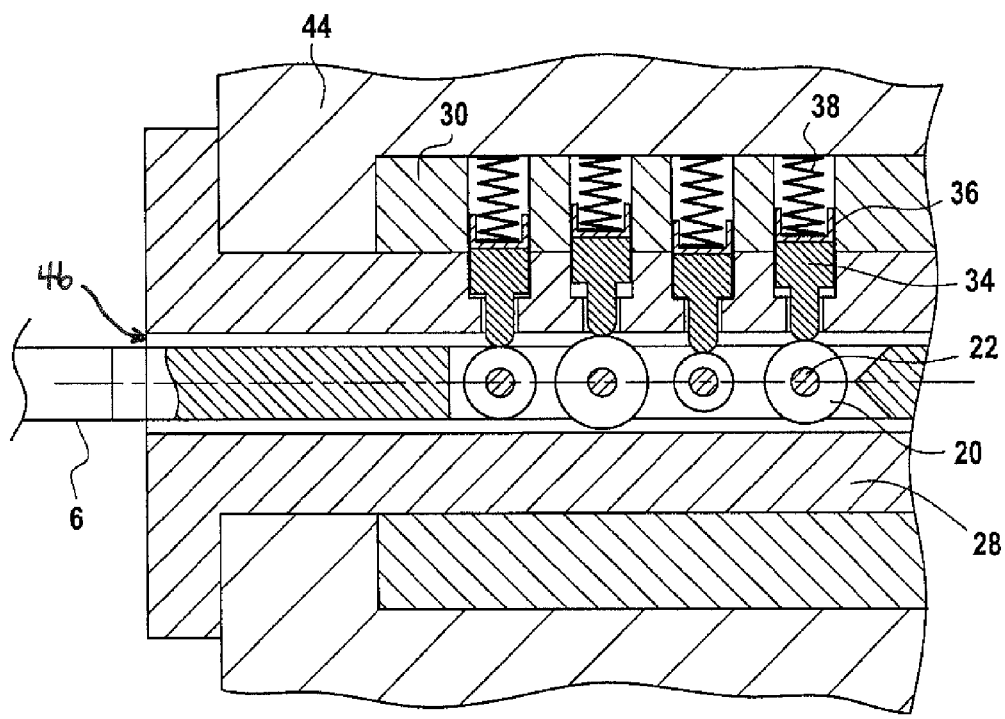
FIG. 5 is a cross-section of the assembly formed by the key and pin cylinder as illustrated in FIG. 4 in the plane of the key.

As illustrated in FIGS. 3 to 5, a key according to the invention is designed to cooperate with a lock cylinder 26 specific in that it comprises a series of pins designed to cooperate with the series of rollers.

The cylinder comprises a rotor 28 designed to turn inside a stator 30. The rotor has a keyway 45 into which the key is designed to be inserted. Said keyway has two grooves 46, positioned symmetrically on either side of the keyway, approximately in the middle. The keyway is staggered with respect to the axis of the cylinder along one of the diameters of the cylinder, as seen in FIG. 3.

A set of bores 32 is made in the cylinder, extending radially from the outside of the stator to the keyway of the rotor, comprising two parts machined in the rotor and stator respectively. An assembly formed by a pin 34 and a counter-pin 36, independent of each other, is installed in each of the radial bores and pushed towards the inside of the cylinder by a spring 38, supported by the counter-pin. The bottom of the bore comprises a shoulder that enables a pin head to pass through so that it is in contact with the key and prevents the body of the pin going any further by the action of the spring. The pin head, opposite the counter-pin, has a dome-shaped end, approximately the shape of a spherical dome. This shape is particularly appropriate for the pins to take up position opposite the circumference of the rollers mounted in the axis of the key.

In the rest position of the cylinder, that is, in the position it takes up naturally when the key is not inserted in the lock cylinder, the proximal bore in the rotor is positioned at an angle in the extension of the distal bore in the stator, such that the pin and its corresponding counter-pin can slide along the bore formed by the two parts combined. Furthermore, the pin is pushed into the rotor by the spring supported by the counter-pin, such that, in the rest position, without a key inserted into the cylinder, the counter-pin extends partly into the rotor and partly into the stator, preventing the rotor from rotating in relation to the stator.

As illustrated, the pin and counter-pin are both dissociable elements one of which has a convex contact face 40 and the other a concave contact face 42. Said faces have a radius of curvature approximately equal to the radius of the rotor. The rotor is thus designed to turn inside the stator when the contact faces of the pin and the counter-pin are positioned at the junction between the rotor and the stator.

It is understood that the movement of the rotor in the stator will only occur when the pins are placed at the correct height in their radial bore, so that only the pins are in the rotor and only the counter-pins are in the stator.

To achieve this, the correct key must be used, that is, the key whose impressions and rollers are of the right dimension and are correctly placed on the blade, inserted correctly until it comes up against neck 6 in the cylinder.

During insertion, the main action of the blade is to push the pin heads towards the stator, therefore compressing the spring via the counter-pin. When the key is in place, the different pins are pushed by the counter-pins to the bottom of the corresponding impressions and if the impression is in the correct place and of correct dimension, the assembly formed by the pin and counter-pin is adjusted in radial position so that the opposite faces are located at the junction between the rotor and the stator, which can turn freely.

Impressions of different depths and rollers of different diameters will be made to obtain a unique key that corresponds to the dimensions of the pins placed in a unique manner in the lock cylinder.

For example, on FIG. 3, a dotted line is used to indicate the shape of the impressions that would enable the lock to be opened and a solid line to indicate the actual shape of the key. It can be seen that a set of pins are arranged to be activated by a set of impressions made on one of the edges and that the other pins are arranged so as to be activated by a set of impressions made on one of the faces. As illustrated, depending on whether an impression is too deep or is absent at the required place, the assembly formed by a pin and counter-pin will be driven more or less into the bore and the pin or the counter-pin then prevents the rotor from turning.

Figure 8:
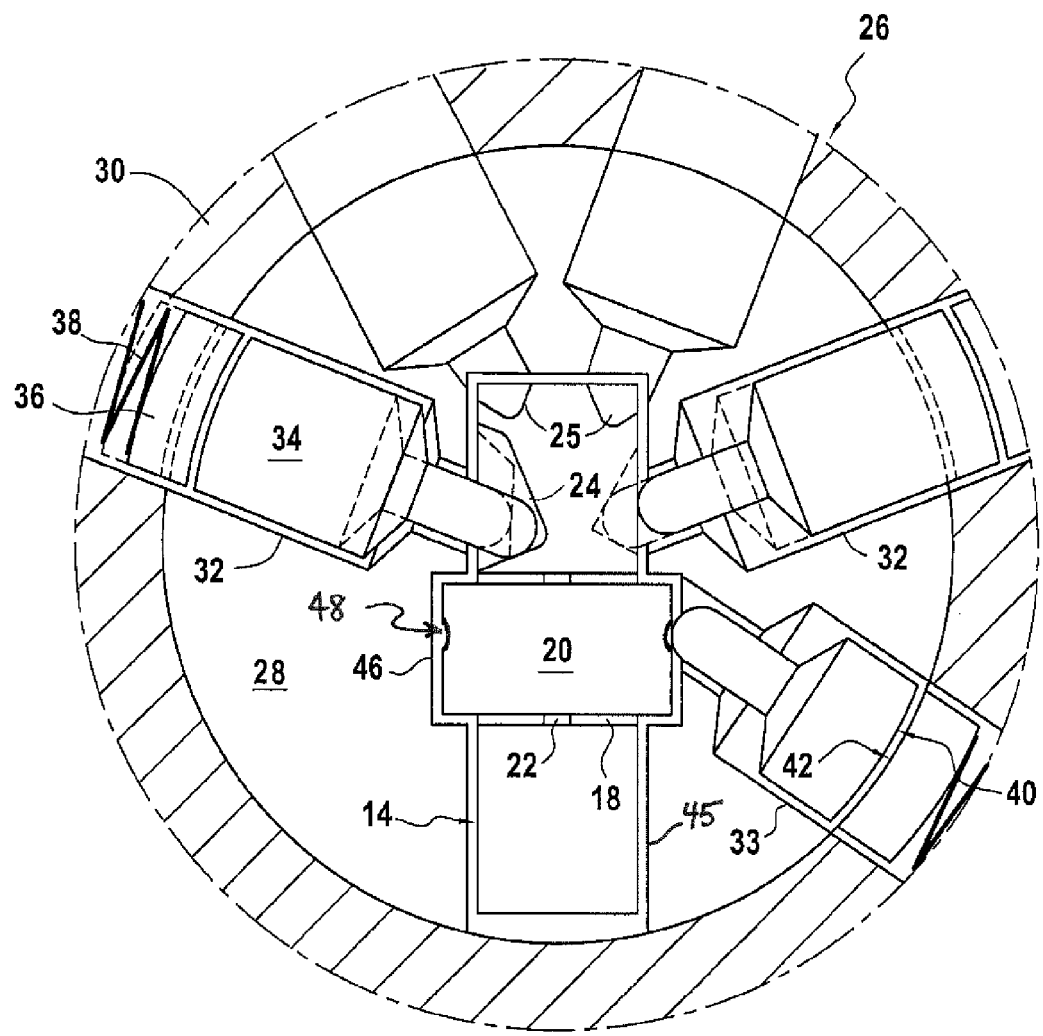
FIG. 8 is a view in cross-section similar to FIG. 5 for a further embodiment of a bit key and pin cylinder assembly according to the invention wherein the respective key and cylinder signature patterns comprise bit elements that are provided by pins in an angular arrangement, which pins are shown as if they were the same cross-sectional plane on the figure although they are staggered axially along the key blade.

The invention also covers an embodiment in which at least some of the rollers have an annular groove 48 around the circumference of the roller 20, as illustrated in FIG. 8. The groove can advantageously have an asymmetrical hollow profile like the other impressions on the key to cooperate as well as possible with pins that move into them at an angle. It should be noted that the groove is perfectly compatible with the role of guide roller to facilitate insertion of the key until it cooperates with the cylinder. For this the groove needs to be formed in a central part of the roller, leaving the original cylindrical part on either side.

According to the invention, the lock cylinder comprises a specific series of pins, in which each of the pins is designed to cooperate with one of the rollers on the key previously described. The set of bores 33 corresponding to this specific series extends along an inclined axis (as shown in FIGS. 3 and 4) with respect to the axis perpendicular to the rotational axis of the rollers such that it points to the rotational axis of the rotor. In this way, the pins and counter-pins designed to slide in said bores can be placed on either side of the curved junction plane between the rotor and the stator.

As can be seen on FIGS. 4 and 5, the number of rollers will be at least equivalent to the number of pins placed in series in the cylinder specifically to be activated by said rollers. The sizes of the rollers are chosen according to the shape and dimension of the pins so that the pins are correctly retracted when the key is inserted into the keyway as far as it will go in order to cause rotation of the rotor.

It is understood that the diameter of the rollers is chosen according to the dimension of the pins. In the rest position of the lock cylinder, certain pins can be arranged so as to project further into the keyway than the other pins, and said pins are made to correspond with the rollers whose diameter is smaller than the others. Advantageously, the fact that each of the rollers is mounted to rotate freely around its axis enables the key to be easily inserted without striking the pin heads projecting into the keyway. A large diameter roller radially pushes said pin heads out of the way without difficulty until it comes into contact with its corresponding pin head when the key is inserted into the lock cylinder as far as it will go, and the pin heads that were pushed away radially during insertion of the key return to their original position under the action of the corresponding springs after the large diameter roller has passed.

When the key is inserted into the keyway of the lock cylinder, the large diameter rollers which project on either side of the blade slide into the grooves formed symmetrically on either side of the keyway. The grooves are dimensioned to let the largest diameter roller pass through and they are useful in centering and guiding the key when being entered in the cylinder.

The above description clearly explains how the invention enables its objectives to be achieved, particularly its security objectives, by proposing a key whose duplication is impossible without having a blank key with rollers. The context is that of a security key to which a signature pattern is to be given. According to the invention, said signature pattern is obtained by added elements that can form either embossed areas or hollowed depressions whereas previous keys would lead only to vary the depth of depressed impressions. Providing for added elements projecting out of the blade beyond its faces also enables the key to be guided during its insertion into the lock cylinder. The added element has a cylindrical or spherical shape and is mounted rotationally, which has the advantage of minimizing the friction against the pins that project into the keyway when the key is inserted into the lock cylinder. Each roller is arranged so that it can turn round in a direction parallel to the direction in which the blade is inserted into the lock cylinder, which facilitates the displacement of the key in the lock cylinder, during both insertion and removal, since the key is free to rotate. The rollers cylindrical or spherical shape also facilitates the design of a reversible key.

Furthermore, the fact that the signature pattern of the key is obtained through the combination of added elements means that production of the basic elements of the key can be standardized while enabling duplication of the keys to be controlled, due to the fact that the assembly of the rollers in the key in the production unit cannot be changed subsequently and to the many possible combinations of said elements.

In addition to the solidity of the key and the steady reliability or its signature, an enhanced security against unauthorized copies is obtained, due to the fact that reproducing a key with a definite signature is not possible by just machining a blank key to duplicate the outer surface of the key blade as is done conventionally for blades having a specific bit signature only inherent to dot impression recesses. Reproducing the key signature pattern corresponding to a definite series of successive rollers each having a specific diameter requires being performed by a locksmith conveniently equipped with new rollers of all diameters needed and with the material for mounting them correctly in new blade blanks with axial windows.

Specific features of the key according to the invention as described above will now be detailed with reference to FIGS. 6 and 7.

On FIG. 6 reference numerals 24 and 25 have been added to designate dot impressions provided by recesses hollowed out of the solid blade surface. In the key of the invention, such impression recesses are present aside the windows 18 receiving the rollers, on either flank branches of the solid blade frame along the window. An impression recess 24 has been shown as made in the foreside face of the blade frame on the upper branch. In a reversible key, a symmetrical recess will be provided on the backside face of the lower branch of the blade frame. Each such recess will afford a signature bit in the full signature pattern of the key. Another recess 25 has been shown as machined in the edge surface of the key blade. It should be understood that it is coupled with a symmetrical recess in the opposite edge of the blade which however has not been shown. According to a preferred embodiment of the invention the symmetry with respect to a median axis centered in the blade thickness along the axial window as required for a reversible key will be easily obtained by combining a fixed signature pattern of impressions arranged along the solid blade branches on each edge of the blade with a variable signature pattern as set by a series of interchangeable rollers arranged along the blade window. It is supposed here that window 18 is arranged as shown along the median axis in the middle of the flat key blade and that the holes 22 for the spindles are bored right transversal to the blade axis from one blade edge (the downside one on FIG. 6) and located in the medium plane through the blade thickness. As preferred, the rollers are simple cylindrical rollers with axes each centered on the corresponding spindle.

FIG. 7 differs from FIG. 2 only by the fact that the spindles for mounting the rollers in the key blade are not at identical intervals. Different spaces between each two successive rollers in the series are shown as distances d1, d2, d3. Varying such distances along the key blade affords further means to conform to a definite key signature pattern in addition to the variable diameters of the rollers. In industrial practice however a regular distribution of the spindles holes will be preferred, with the same value d for the interval distance between each two successive holes as shown on FIG. 2. Various blade configurations can still be obtained by using rollers of different diameters and mounting them in different orders along the blade window, it being reminded that the key configuration according to the invention comprises at least two interchangeable rollers of different diameters. Each locksmith having to reproduce a key conforming to a definite pattern will select each required roller from a suitcase containing rollers of different diameters arranged in sets of rollers of a same diameter identified by a signature bit code and mount each roller so selected while ordering them in series along the key blade window in accordance with the order with the successive bit codes in the identification code for the full key signature. To facilitate the reproduction of similar keys with different signatures all roller sets available to the locksmith in the suitcase will be with a diameter less than half the space intervals between the successive spindle holes in the available key blanks.

In connection with FIG. 8, a further embodiment for the key and cylinder assembly according to the invention is shown to illustrate the fact that the space available around the cylinder axes allows for having two pin and counter-pin sets arranged symmetrically on a same cross-sectional area facing the upside edge of the blade as represented. That side edge is the one with no spindle hole opening on the surface, since the holes are blind holes bored out from the opposite side edge (the downside one on the drawing). Clearly enough, the configuration is suitable for having two series of impressions recessed along the blade in the angles between that side edge and the respective blade side faces instead of just one in the edge middle.

As to the reproduction of a key depending on the lock signature for a definite lock it should be used with, it is clear from the above description that in preferred embodiments it will be performed by specific locksmiths having a convenient suitcase with appropriate key blanks, spindles, and rollers at his disposal. The blanks in the suitcase will preferably be all with identical blade configuration, each conforming to a same part of the full key signature as determined by impression recessed previously machined in the blank blade surface. That fixed part of the key signature, first present with its successive bit elements encoded fixed in the solid part of the blade, outside the window though it, is used as a constant locksmith's signature matching with a definite common part in the lock signatures in a given production series of locks. The complete key signature will be obtained by combining it with a variable part of the full lock signature when the locksmith will mount the appropriate rollers in the appropriate order to produce the key conforming to a key signature matching with the complete lock signature of a given lock as know from its identification code.

The invention claimed is:

1. A key comprising:
   a blade having a first side face and an opposite second side face, the first side face and the second side face having a length extending in an axial direction, and a width extending in a direction perpendicular to the axial direction;
   a window extending in the axial direction and being formed by an opening through a thickness of the blade from the first side face to the second side face;
   at least two spindles fixed transversely across the window in the width direction; and
   at least two rollers, each of the at least two rollers being mounted to one of the at least two spindles such that the at least two rollers are freely rotatable around a respective one of the at least two spindles without touching one another.

2. The key according to claim 1, wherein the at least two rollers are arranged successively one after the other along said window, in a series along said blade, said rollers being (i) selected from interchangeable rollers having different diameters and (ii) ordered in said series to conform to at least a part of a key signature.

3. The key according to claim 2, wherein at least one of said at least two rollers has a diameter greater than the thickness of said blade, the at least two rollers being mounted rotationally around said respective spindles in a median plane of the blade, so that the at least one roller projects on either side of said blade from the first side face and the second side face.

4. The key according to claim 1, wherein the at least two rollers are fixed relative to the thickness of the blade.

5. The key according to claim 1, further comprising at least one bit impression hollowed out of the first side face or the second side face of the blade.

6. A locking assembly, comprising:
   the key according to claim 1; and
   a lock cylinder having a rotor and a stator, the stator including a set of pins and counter-pins, the pins and the counter-pins being respectively positioned to enable rotation of the rotor in the stator for locking or unlocking, said pins being arranged to slide radially in the rotor so that each of the pins corresponds to one of the at least two rollers when the blade is inserted into the lock cylinder.

7. The locking assembly according to claim 6, wherein a diameter of each of the at least two rollers is determined such that when the blade is inserted into the lock cylinder, a surface of each of the at least two rollers will cooperate with an end of a corresponding one of the pins.

8. The locking assembly according to claim 7, wherein
   said at least two rollers are arranged axially in series along said window in correspondence with said set of pins arranged in the lock cylinder,
   the number of said pins is equivalent to the number of said at least two rollers, and
   a space between each of said pins in said axial arrangement are equivalent to a space between each one of the at least two rollers.

9. The locking assembly according to claim 8, wherein said lock cylinder comprises a keyway for insertion of the blade, the keyway having two grooves placed symmetrically on either side thereof so that the at least two rollers, which have a larger diameter than the thickness of said blade, can pass through the keyway.

10. The locking assembly according to claim 7, wherein each of said at least two rollers has an annular groove around a circumference thereof to cooperate with the end of a corresponding one of the pins of said cylinder.

11. A bit key comprising:
    a key blade having a first side face and an opposite second side face, the first side face and the second side face having a length extending in an axial direction, and a width extending in a direction perpendicular to the axial direction;
    an axial window formed by an opening through a thickness of the blade from the first side face to the second side face;
    a plurality of spindles fixed transversely across the window in the width direction; and
    a plurality of rollers, each of the plurality of rollers being rotatably mounted to a respective one of the plurality of spindles, at least two of the plurality of rollers having different diameters and being interchangeably mountable to at least two respective ones of the plurality of spindles.

12. The key according to claim 11, wherein a solid part of said blade aside from said window is provided with a series of impression recesses conforming to a fixed part of a key blade signature.

13. The key according to claim 12, wherein each of the plurality of rollers is a right cylinder roller and is provided with an annular groove recess around a periphery of the respective roller.

14. The key according to claim 11, wherein the at least two of the plurality of rollers having different diameters are interchangeably mountable to any two of the plurality of spindles without touching one another.

15. The key according to claim 11, wherein the plurality of rollers are fixed relative to the thickness of the blade.

16. The key according to claim 11, further comprising at least one bit impression hollowed out of the first side face or the second side face of the blade.

17. A key comprising:
    a blade having a first side face and an opposite second side face, the first side face and the second side face having a length extending in an axial direction, and a width extending in a direction perpendicular to the axial direction;
    a window extending in the axial direction and being formed by an opening through a thickness of the blade from the first side face to the second side face;
    at least two spindles fixed transversely across the window in the width direction;
    at least two rollers being arranged along the window in a middle of the blade, each of the at least two rollers being mounted to one of the at least two spindles such that the at least two rollers are freely rotatable around a respective one of the at least two spindles; and
    at least one bit impression hollowed out of the first side face or the second side face of the blade on either side of the window.

18. The key according to claim 17, wherein the at least two rollers are mounted to the respective ones of the at least two spindles without touching one another.

19. The key according to claim 17, wherein the at least two rollers are fixed relative to the thickness of the blade.

* * * * *